United States Patent
Fackler et al.

(10) Patent No.: US 11,583,958 B2
(45) Date of Patent: Feb. 21, 2023

(54) METHOD FOR TESTING A JOINT (71) Applicant: Bayerische Motoren Werke Aktiengesellschaft, Munich (DE)

(72) Inventors: Christian Fackler, Munich (DE); Florian Soldner, Brannenburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 42 days.

(21) Appl. No.: 17/288,249

(22) PCT Filed: Oct. 1, 2019

(86) PCT No.: PCT/EP2019/076499
§ 371 (c)(1),
(2) Date: Apr. 23, 2021

(87) PCT Pub. No.: WO2020/083617
PCT Pub. Date: Apr. 30, 2020

(65) Prior Publication Data
US 2021/0387289 A1 Dec. 16, 2021

(30) Foreign Application Priority Data
Oct. 24, 2018 (DE) ...................... 10 2018 126 466.6

(51) Int. Cl.
*B23K 31/12* (2006.01)
*H04N 5/232* (2006.01)
(Continued)

(52) U.S. Cl.
CPC ........... *B23K 31/125* (2013.01); *G01N 21/95* (2013.01); *G06T 7/001* (2013.01);
(Continued)

(58) Field of Classification Search
CPC ... G01N 2021/95646; G01N 21/95684; G01N 2021/8845; G01N 21/956;
(Continued)

(56) References Cited

U.S. PATENT DOCUMENTS 5,533,146 A * 7/1996 Iwai ..................... B23K 9/0956
348/90
6,661,911 B1 12/2003 Ishikura et al.
(Continued)

FOREIGN PATENT DOCUMENTS

| CN | 101952715 A | 1/2011 |
| CN | 102814574 A | 12/2012 |

(Continued)

OTHER PUBLICATIONS

International Search Report (PCT/ISA/210) issued in PCT Application No. PCT/EP2019/076499 dated Jan. 2, 2020 with English translation (three (3) pages).
(Continued)

*Primary Examiner* — Masum Billah
(74) *Attorney, Agent, or Firm* — Crowell & Moring LLP (57) ABSTRACT

A method for inspecting a joint of an assembly, in particular an assembly of a motor vehicle, consisting of two components joined together by a joining process, includes the method steps of: orienting an inspection device with respect to at least one region of the joint to be tested, imaging an actual image of the joint to be tested on a display device; and displaying joint information relating to the joint to be tested of the assembly via the display device.

14 Claims, 3 Drawing Sheets

(51) Int. Cl.
*G01N 21/95* (2006.01)
*G06T 7/00* (2017.01)
*H04N 7/18* (2006.01)

(52) U.S. Cl.
CPC ......... *H04N 5/23299* (2018.08); *H04N 7/183* (2013.01); *G06T 2207/30136* (2013.01); *G06T 2207/30152* (2013.01)

(58) Field of Classification Search
CPC ..... G01N 2021/8887; G01N 2201/102; G01N 2021/95661; G01N 2201/0826
USPC .......................................................... 348/135
See application file for complete search history.

(56) References Cited

U.S. PATENT DOCUMENTS

| | | | |
|---|---|---|---|
| 2006/0049158 A1 | 3/2006 | Schurmann et al. | |
| 2010/0326196 A1 | 12/2010 | Fukuda | |
| 2014/0132953 A1* | 5/2014 | Jeong | G01N 21/956 356/237.5 |

FOREIGN PATENT DOCUMENTS

| | | |
|---|---|---|
| CN | 108029244 A | 5/2018 |
| DE | 692 06 928 T2 | 5/1996 |
| DE | 10 2004 039 410 A1 | 2/2006 |
| DE | 600 32 059 T2 | 7/2007 |
| DE | 10 2016 005 844 A1 | 12/2016 |

OTHER PUBLICATIONS

German-language Written Opinion (PCT/ISA/237) issued in PCT Application No. PCT/EP2019/076499 dated Jan. 2, 2020 (seven (7) pages).
German-language Search Report issued in German Application No. 10 2018 126 466.6 dated Dec. 19, 2018 with partial English translation (12 pages).
Antonelli et al., "Enhancing the Quality of Manual Spot Welding through Augmented Reality Assisted Guidance," 9th CIRP Conference on Intelligent Computation in Manufacturing Engineering—CIRP ICME '14; Procedia CIRP, 2015, pp. 556-561, vol. 33, XP055652204 (six (6) pages).
English-language Translation of Office Action issued in Chinese Application No. 201980055450.1 dated Nov. 30, 2021 (nine (9) pages).

\* cited by examiner

METHOD FOR TESTING A JOINT

BACKGROUND AND SUMMARY OF THE INVENTION

The invention relates to a method for inspecting a joint of an assembly, in particular of an assembly of a motor vehicle, consisting of at least two components that have been joined together in a joining method.

Methods for inspecting manufacture of components are known from the prior art. These methods provide, for example, the use of a fault detection unit for detecting a structural fault of a component and the determination of a piece of fault information. These known methods, however, essentially relate to the manufacture of components.

There exists, however, the requirement of inspecting, not the actual manufacture of a component, but a joint consisting of at least two components that have been joined together to form an assembly, in particular an assembly for installation or installed in or on a motor vehicle.

The underlying object of the invention is to provide a method that enables a simple, fast and reliable inspection of a joint.

The object is achieved by means of a method for inspecting a joint of an assembly according to the independent claim. The corresponding dependent claims relate to potential embodiments of the method.

The invention relates to a method for inspecting a joint of an assembly, in particular of an assembly of a motor vehicle, consisting of at least two components that have been joined together in a joining method, with the following method steps: (a) orienting an inspection device toward at least one area of a joint to be inspected, (b) reproducing a real image of the joint to be inspected on a display device, and (c) displaying a piece of joint information relating to the joint to be inspected of the component assembly via the display device.

The joint to be inspected can, for example, have been manufactured using a joining method implementing a form-fit, force-fit and/or materially bonded connection. In particular, this can be a joining method based on molding, casting, welding, soldering and/or bonding. A composite joining method and/or a pressing joining method are also conceivable for the formation of the joint to be inspected of the component assembly. The at least two components that have been joined together can consist of the same or different materials or material structures, that is, for example, of metal and/or plastic. For example, steel, aluminum can be used as metal. The joining method for a metal material can be, for example, a metal welding method, a pressure welding method, a resistance (pressure) welding method and/or a remote laser welding method. For example, polyvinyl chloride can be used as plastic. The joining method for a plastic material can be, for example, a PVC welding method. In the case of a weld connection formed by a welding method, in particular of a resistance spot weld connection, two, three or four weldable components, in particular sheet metal parts, can be conjointly connected in the depth direction at a weld connection zone. The weld connection to be inspected can be a butt weld between two or more pieces of sheet metal, a fillet weld between a tube and a piece of sheet metal or a fillet weld between two pieces of sheet metal. Finally, the joint can comprise an adhesive connection with an adhesive seam.

By means of the automated and/or manual orientation of the inspection device, for example, by an inspector, an area to be inspected of the joint can be selected and/or a desired viewing orientation, a viewing angle and/or a viewing distance can be chosen.

The reproduction of a real image of the joint to be inspected on a display device is typically to be understood as an active or passive representation of an image of the joint to be inspected on the display device. An active representation can occur, for example, by means of the active reproduction, supported by electronics, of the real image of the joint to be inspected on a screen. A passive reproduction can occur in the form of a viewing of the real image of the joint to be inspected by an inspector through an area, configured to be at least transparent, of the display device. The area to be inspected of the joint is reproduced in this case as a real image on the transparent area of the display device, for example on a lens forming part of a pair of so-called smartglasses, and perceived by the inspector. In other words, the inspector can examine the area to be inspected of the joint by looking through the transparent area of the display device. A real image can be reproduced on the transparent area here. In general, this can occur through the use of so-called augmented reality systems. These systems enable an optical overlaying of the real environment with a computer-generated virtual environment. Virtual information can be herein, for example, displayed on a display or projected onto a lens and brought into a superimposed position with the real environment.

The inspection device can be formed in an assembly shared with the display device, which can comprise a capturing device, i.e., for example, a camera, and simultaneously a display device, i.e., for example, a display. The inspection device and/or the display device can thus be configured as a portable electronic end device or as an electronic mobile device. For example, a smartphone, a tablet computer and/or a portable computer (e.g., laptop) can be used as an electronic end device. In particular in cases where the location of the joint to be inspected is in an area that is difficult to access and/or dangerous for an inspector, an arrangement of the display device at a distance from the inspection device can be expedient. It can thus be provided, for example, that the inspection device is arranged by way of a holding means on welding tongs, a gluing robot or a welding robot, and thus renders possible a control of the position and/or size of, preferably all, welding and/or bonding spots or welding and/or bonding seams, in particular automatically, in serial production. For example, an image of the joint to be inspected taken by the inspection device can be transmitted wirelessly or via a cable connection to the display device for display or output at the same.

An inspection of at least one area of the joint to be inspected can be performed by the inspector that includes the real image of the joint to be inspected reproduced on the display device and the joint information displayed on the display device. The inspection preferably comprises a comparison of the real image of the joint to be inspected reproduced on the display device and the joint information displayed on the display device. The inclusion of the real image reproduced on the display device and the simultaneously display of the joint information makes it possible for the inspector to capture the essential information for the assessment and thus for the inspection of the joint without having to avert his gaze from the display device. The displayed joint information can comprise alphanumeric characters and/or graphic elements. For example, which joined components are involved (e.g., assembly number), which inspection actions the inspector has to perform (e.g., an inspection plan) and/or which areas of the joint are to be inspected can be indicated to the inspector in text form.

If the inspection comprises a comparison, the inspector can perform an assessment of the extent to which a reproduced real image corresponds to a displayed piece of joint information, in particular to a piece of target joint information. For example, it can be indicated that a first and a second area must have a special geometry, i.e., for example, a curvature, and the inspector assesses whether these curvatures are present. The target joint information thus corresponds to a predefined target state of the joint. Target joint information can at least partially comprise a piece of information relating to a geometry, a temperature, a position, an orientation and/or a tolerance of a defined target state of the joint to be inspected. In particular in the case of a weld connection, the displayed target joint information can comprise target data for a position (angle, position, orientation, start and/or end), dimension (length and/or thickness) of a joint, i.e., for example, of a weld seam, and/or at least one of the two components to be joined, i.e., for example, to be welded.

The joint information can be displayed at least partially as at least a piece of target joint information comprising a spot, line and/or surface-area range of a predefined target state of the joint to be inspected. The inspection of the joint can in particular comprise a determination, to be made by the inspector, that the reproduced real image is in contact with, and/or a defined area thereof lies within, a spot, line and/or surface-area range of the target joint information. By means of the display of a piece of target joint information comprising spot, line and/or surface-area ranges, the inspector can perform a comparison of the target joint information with the displayed real image that is to be considered in view of this information in a simple manner. A surface-area range can also comprise a perspective representation so that it is also possible to display surface-area ranges that appear three-dimensional. It is thereby also easily possible to compare a piece of three-dimensional joint information in the form of a perspective representation with the displayed real image of the joint. The contact or non-contact and/or the lying-within or not-lying-within of a defined area of the reproduced real image can thereby be executed easily by the inspector. The image assessed by an inspector can also be stored and, if necessary, documented whenever a display or reproduction of the real image and of the target joint information occurs on a display device configured as a display. The target joint information can at least partially concern a piece of information relating to a geometry, a temperature, a position, an orientation and/or a tolerance of a defined target state of the joint to be inspected. In particular, the inspection of the target joint information with the reproduced real image can comprise a measuring of the joint to be inspected so that the determination of measurement values occurs through a comparison of the reproduced real image with a reference means, for example a length measurement scale, by the inspector.

It can be provided that a real image of the joint to be inspected is captured by a capturing unit arranged in particular on the inspection device. The capturing unit can be configured, for example, as an optical capturing device, i.e., for example, as a camera, and reproduce or display the captured image and/or a captured image sequence or a film of at least a part of the joint to be inspected, preferably in real time, on the display device provided with an optical output means. The optical output means can comprise a display or an arrangement consisting of a projection surface and a projector projecting onto the latter. The projection surface can be opaque, translucent or transparent.

As an alternative or in addition to a capturing of the real image of the joint to be inspected, it can also be provided that, by reproducing the real image of the joint to be inspected on at least one transparent area of the display device, a reproduction of at least a part of the joint to be inspected is made available to the inspector for an inspection or for a comparison with a piece of joint information. For example, the transparent area of the display device can be configured as part of a lens, wherein the joint information is projected onto the lens via, for example, a projector. The real image of the joint to be inspected, which is to be provided to the inspector for the inspection and is displayed or provided by means of the display device, can be observed as the reproduction, to be located on the lens, of the real image. This image is perceived by the inspector while looking through the lens during the observation of the joint to be inspected through the lens. In the case of a display device comprising a plurality of optical elements, the reproduction of the real image of the joint to be inspected formed on the eyepiece lens or the optical element closest to the eye can be understood as the reproduction of the real image on the display device.

It can further be provided that there occurs (a) a display of at least one reference marking on the display device and (b) an orientation of the inspection device in relation to the joint and/or an adjustment of the at least one reference marking in such a manner that the at least one reference marking is brought into a predetermined relative position, in particular into alignment, with at least one real reference element. By means of the reference marking indicated on the display device and the defined relative orientation of the same to a real reference element also reproduced on the display device, in particular a graphically displayed piece of joint information can be brought into a suitable relation and/or connection with the real image of the joint reproduced by the display device. This allows the inspector to conduct an inspection or a comparison of the joint to be inspected in a faster, easier and more reliable manner. In addition to bringing a reference marking into alignment with a reference element by means of the movement of the inspection device, alternatively or additionally, an adjustment of a display option, e.g., a scaling of the displayed graphic joint information, can be carried out. A change in a scaling of the displayed graphic joint information can also make it possible for a piece of graphic joint information to be displayed with the real image of the joint reproduced on the display unit in a manner that is suitable for the inspector. The reference element used can be, for example, a prominent area, i.e., for example, a rise, an edge, a depression, of the joint itself. A reference marking could also be provided specifically for this purpose on at least one of the components to be joined together. Finally, alternatively or additionally, another element can also act as a reference marking, which is mounted, for example, on a body which is, at least in the state of the inspection of the joint by the inspector, in a predefined position and/or orientation relative to the joint to be inspected. For example, this can be a holder that holds the component assembly provided with the joint.

A further advantageous method step provides for the execution of a computer-based measurement process on the joint to be inspected, in particular before or during the inspection of the joint, in order to generate a piece of measurement process information, in particular comprising a measurement result, and for the inclusion of the measurement process information in the displayed joint information.

The computer-based measurement process can be executed by a measurement process device. The measurement process device can be configured as a separate element and/or as a unit integrated in the inspection device. As the measurement process takes place before or during the inspection of the joint to be carried out by an inspector, the inspector can be provided with helpful information for the assessment of the quality of the joint through the provision of the measurement process information and in particular through the provision of measurement results from the measurement process. For example, an upstream measurement process comprises the inspection of whether a weld spot lies within a first geometrically defined surface area, i.e., for example, a first circular area (tolerance circle) and simultaneously does not extend beyond a second geometrically defined surface area, i.e., for example, a second circular area. In this case, a joint spot to be qualified as "good" could be provided. This information of the "good" joint spot can be displayed to the inspector as joint information so that this information is available to the inspector during the visual inspection and so that this joint location thus need not be inspected further by the inspector either. Alternatively or additionally, areas of the joint identified as "not good" by the computer-based measurement process can be output to the inspector as areas to be inspected or as areas to be assessed, preferably can be displayed in a manner graphically coupled with the CAD data generated in connection with the computer-based generation of the joint.

The computer-based measurement process can preferably be run in an automated manner, i.e., an automated capturing of at least one area of the joint could be measured in a measurement process step and the resulting measurement result could be displayed to the inspector as part of the joint information. The measurement process can comprise, for example, an ultrasound measurement, a computer tomography measurement and/or an image contrast and/or image brightness measurement. The measurement result of the measurement process can be output to the inspector as a measurement result (good/bad) and/or as a measurement value (numerical value).

In particular, a comparison of the measurement result with a predefined target measurement result in order to determine a piece of deviation information and an inclusion of the deviation information in the displayed joint information can prove to be advantageous. The deviation information included in the joint information indicates to the inspector whether and, if appropriate, to what degree there is a qualitative and/or quantitative deviation of at least an area of the joint in comparison with a target measurement result.

In an advantageous further development, the deviation information is output as a deviation marking that is superimposed at least in areas on the real image of the joint reproduced on the display device, in this case the "reading" of the deviation information is simplified for the inspector. The deviation information can also comprise a piece of "good" information. The deviation information can give the inspector an indication that at least the area relating to the deviation information is "not good". In this case, the inspector, by specifically inspecting the area in question, could, if appropriate, nevertheless make a "(still) OK" assessment. To this end, the inspector may, if appropriate, fall back on information and/or considerations that would not be realizable in the computer-based system or only realizable with a disproportionately high investment in their automation.

A further advantageous and optional aspect of the method comprises the fact that at least one piece of joining process information used in a joining process that forms the joint to be inspected and/or derived from a joining process that forms the joint to be inspected is included in the displayed joint information. For example, geometry data used to carry out the joining process as well as data (e.g., process variables) from the joining process carried out as a welding process, such as, for example, a current density, a temperature distribution, a welding current, a welding voltage and/or a tong pressure, can be included in the displayed joining process information. The joining process information can preferably be correlated with geometry data, in particular CAD data of the weld spots, of the joint to be inspected. This renders possible the provision of area-specific joining process information for the joint to be inspected. The geometry data used in the joining process can be based on CAD data and in particular also on volume data. For example, the data sets of the weld spots constructed in CAD could also be considered for the subsequent joint information, thus for example as target joint information of the geometric configuration of the weld spot in question. Alternatively or additionally, a piece of joining process information can be, for example, output, according to which a temperature distribution for a certain spot of the joint, i.e., for example, for a weld spot, was too hot. This "too hot" information is displayed to the inspector, and the inspector is thereby placed in the position to include this information in a consideration or assessment of the joint. The same applies, of course, to other temperature deviations.

The result to be determined by the inspector or his or her assessment of the joint to be inspected can be recorded or documented in an input device by entering a piece of assessment information at least in areas relating to the joint. Preferably, a storage of the assessment information occurs in a data storage device, wherein, optionally, there can additionally occur a correlation of the assessment information to a piece of information relating to an assembly area and/or assembly identification, the joining process, the assessment, the joining process and/or the measurement process. By means of such a documentation of the inspection result assessed by the inspector, it is possible, for example for a post-production worker, to revert to the inspection result at a later point in time and/or at another site, for example at a post-production processing station. The input device and/or the data storage device can be arranged or configured on the inspection device and/or on the display device.

The inspection result entered by the inspector into the input device and/or the automated measurement result of the measurement process can be used as an input signal for an automated, in particular robot-based, reworking of the joint, at least in areas, and/or different countermeasures. A potential different countermeasure is an intervention in the joining process control and the modification of a joining process variable. This countermeasure prevents a fault pattern for joining processes of subsequent component assemblies to be joined together.

The inspection method can be further simplified for the inspector when, through the output of a request, in particular via the display device, the inspector is requested to enter a piece of assessment information via an input device for a piece of deviation information indicating a deviation of a measurement result from a predetermined target measurement result at least in areas. It is rendered possible that the inspector does not have to search for "problem areas" of the joint requiring his/her assessment on his/her own, but rather that the areas to be inspected are indicated to the inspector. It is thereby largely prevented that an inspector "overlooks" an area to be inspected of the joint.

The inspection method can also be simplified by displaying a piece of geometric joint information, in particular a piece of geometry information derived from CAD data of the joint to be inspected, in a first window area of the display device and displaying a piece of information relating to an assembly area and/or assembly identification, a joining process, a deviation, an assessment and/or a measurement process in a second window area of the display. The spatial separation of the geometric joining process information from, for example, a further piece of joining process information can make it easier for the inspector to grasp the respective information quickly and reliably. Preferably, at least the first window area and the geometric joining process information displayed therein can be brought into a superimposed position in relation to the real image reproduced on the display device. The superimposition can occur when the joint information displayed on the display device and the real image of the joint are shown on a display. Alternatively or additionally, the superimposition can also occur on a transparent display element, while an inspector reproduces the joint under inspection as a real image on the transparent display device when looking through the transparent display element.

In addition to the method, the invention also relates to a device for the inspection, in particular by a person, of a joint of an assembly consisting of at least two components, typically in or on a motor vehicle, that have been joined together in a joining method, comprising an inspection device for carrying out the method according to the invention.

All advantages, details, variants and/or features of the method according to the invention and its embodiments and realizations are also transferable or can be applied, to the device according to the invention.

The invention is explained in greater detail with the aid of exemplary embodiments in the drawings.

DETAILED DESCRIPTION OF THE DRAWINGS

In the figures, the method is depicted illustratively based on a resistance spot welding method. The following statements are, however, transferable to other joining methods.

Figure 1:
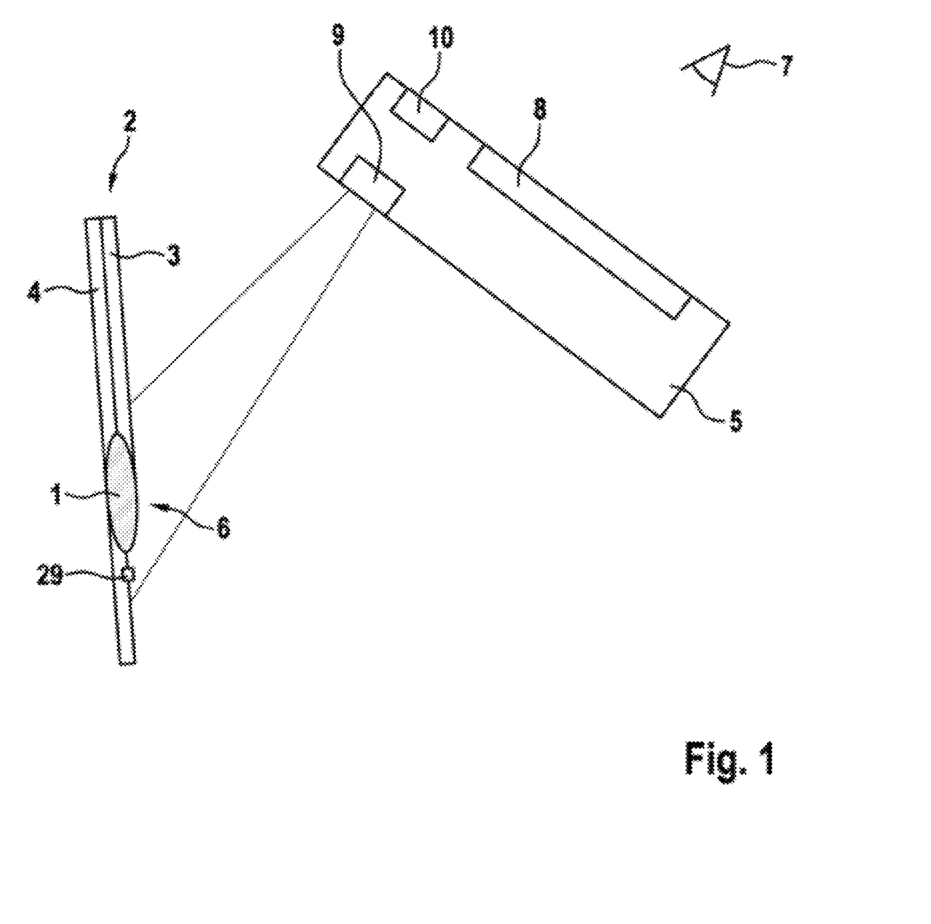
FIG. 1 is a schematic representation of a device for inspecting a joint according to an exemplary embodiment.

FIG. 1 shows a joint 1 of an assembly 2 of a motor vehicle. The assembly 2 is formed by two components 3, 4 that have been joined together. In a first step of the method, an inspection device 5, for example in the form of a smartphone or tablet computer, is oriented toward an area 6 of the joint 1 to be inspected. The inspection device 5 is held in the hand (not shown) of an inspector 7 merely implied in the figure. The inspection device 5 has a display device 8 facing the inspector 7 and configured as a display. The area 6 of the joint 1 is captured via a capturing unit 9, which is configured, for example, as a camera and is arranged on the inspection device 5, and is reproduced or displayed on the display device 8 so that the inspector 7 can view the real image of the joint 1 to be inspected reproduced on the display device 8.

Figure 2:
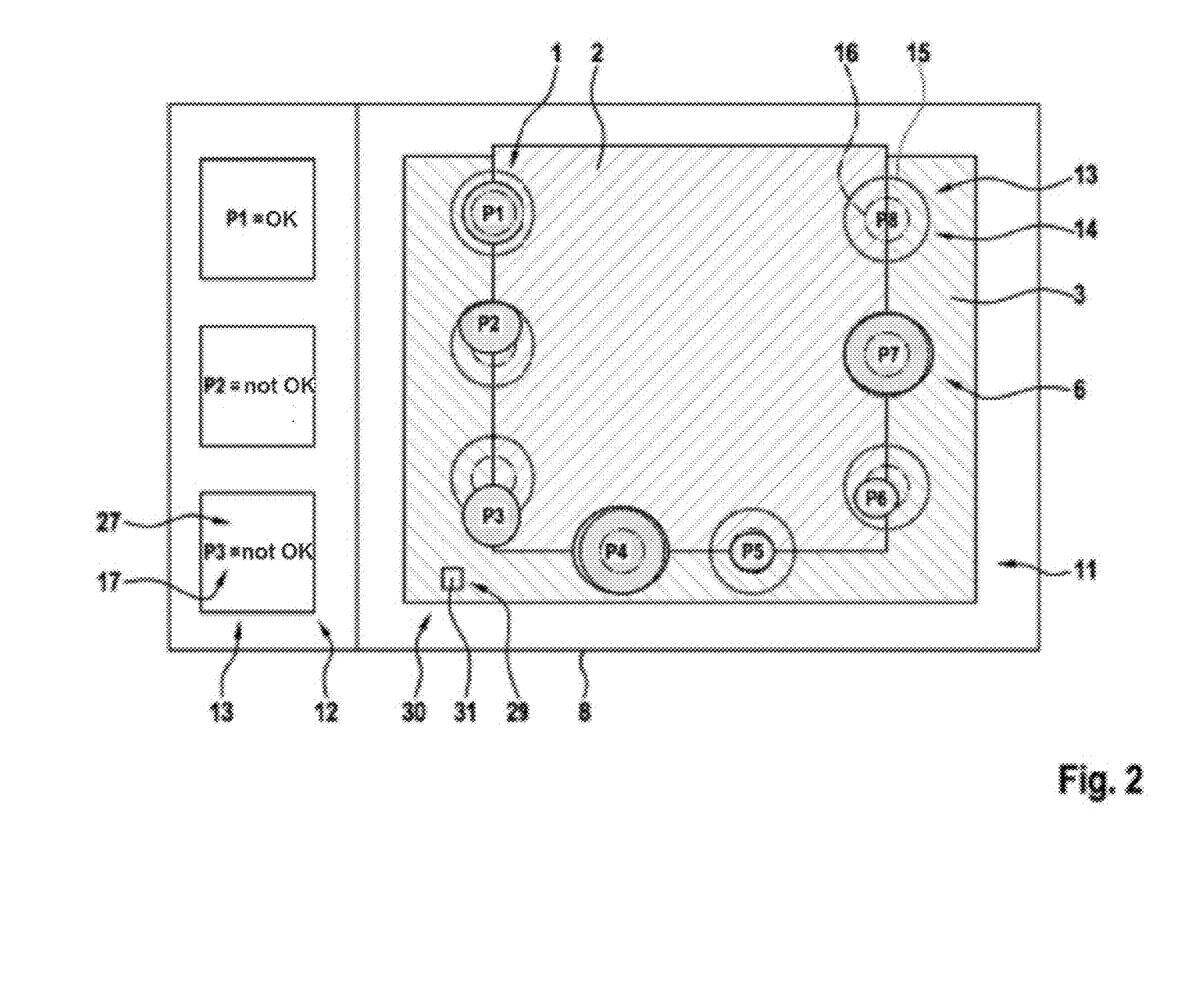
FIG. 2 is a schematic representation of a display of a display device according to an exemplary embodiment.

A reference element 29 is arranged on the first component 2. A reference marking 30 relating to the displayed joint information 13, in particular to the displayed target joint information 14, is displayed on the display device 8. By orienting the inspection device 5 relative to the joint 1 and thus relative to the first component 2, and/or by adjusting the manner in which the at least one reference marking 30 is displayed on the display device 8, an alignment of the real image of the joint 1 displayed on the display device 8 and of the joint information 13 also displayed on the display device 8 is achieved. In particular, the adjustment occurs by means of the placement of the at least one reference marking 30 in a predetermined relative position to, in particular in alignment with, at least one real reference element 29. In FIG. 2, the reference marking 30 and the reference element 29 are respectively illustratively depicted as a square, which has reached the relative target position in the illustration and is visible as a square 31.

FIG. 2 depicts an illustrative configuration of the display and of the reproduction on the display device 8. The display device 8 is divided into two windows 11, 12 or window areas. In the first window 11 shown on the right, the real image of at least one area of the joint 1 to be inspected, which real image is captured via the capturing device 9 and reproduced on the display device 8, is shown. This reproduced real image of the joint 1 comprises a part of the two components 3, 4 to be welded as well as any weld spots P1-P9 located in the border areas of the two components 3, 4 and realized during the joining process. The weld spots P1-P9 are illustratively depicted as completely darkened surface areas with the designation of the weld spots P1-P9. Moreover, in the first window 11 on the right, a piece of joint information 13 is displayed in the form of a piece of target joint information 14. This target joint information 14 illustratively comprises two concentric circles. The circles here constitute tolerance circles for the respective weld spots P1-P9 or for respective, predefined joining locations, wherein an upper tolerance limit 15 (dotted line) and a lower tolerance limit 16 (dashed-dotted line) are indicated for each welding location or each weld spot P1-P9. The capturing device 9 transmits the joint 1 with its weld spots P1-P9 as a real image to the display device 8, where it is displayed. At the same time, the target joint information 14 is displayed in the form of the tolerance limits 15, 16 in a superimposed position.

The second window 12 depicted on the left side of the display device 8 also outputs a piece of joint information 13; however, this is a piece of measurement process information 17 determined in a computer-based measurement process (not shown) on the joint 1 to be inspected, in particular before or during the inspection of the joint 1 by a person. This measurement process information 17 or the measurement result determined from the measurement process leads in a comparison with a predefined target measurement result to a piece of deviation information 27. This deviation information 27 is output in the displayed joint information 13. In the left window 12, the deviation information 27 is displayed in the form which leads the computer-generated result of the comparison of the measurement result with a target measurement result to display for the respective weld spots P1, P2 and P3 "OK" for OK and "not OK" for not OK. The person viewing the display device 8 according to FIG.

2 is thereby informed that at least the weld spots P2 and P3 require a further inspection and that the weld spot P1 is to be regarded as OK.

In addition, it is also possible to output the information on the display device 8 that at least a subset of the weld spots that were automatically determined as "not OK" are to be assessed as definitely not OK, i.e., that these weld spots are also to be assessed as not OK in a further assessment by an inspector. In the case of the weld spot P2, on the other hand, which appears to be adequate with respect to its size and runs over the upper border area 15 only slightly, it would be possible to assess said weld spot in a computer-based manner as "not OK, subject to reservation" and for the inspector to assess the spot as lying within the border area and as OK. In the depicted display, the deviation information can include the following categories for the respective weld spots P1-P9: "OK" (P1), "not OK, subject to reservation" (P2, P6, P7), "definitely not OK" (P3, P4, P5, P8), wherein P8 illustrates a result for a non-existent weld spot. The measurement process information and/or deviation information can be displayed graphically, by colors or in text form on the display device 8.

Figure 3:
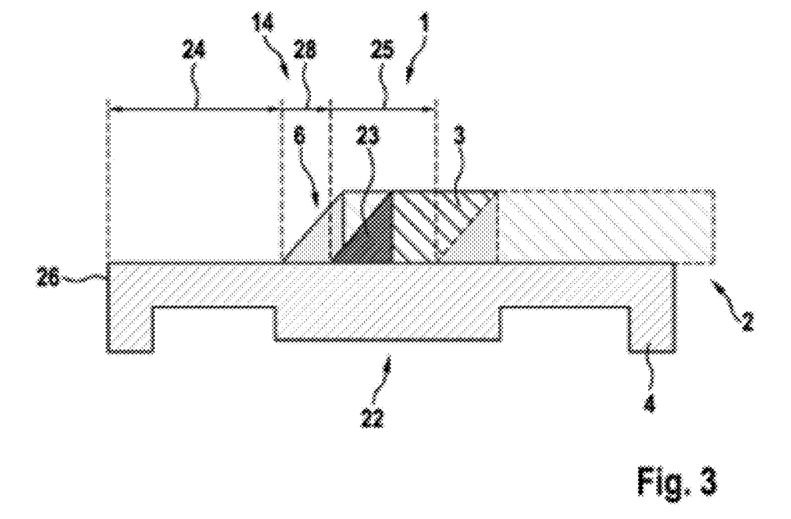
FIG. 3 is a schematic representation of a weld connection to be inspected according to an exemplary embodiment.

FIG. 3 shows a weld connection of a first component 3 with a second component 4 according to an exemplary embodiment. The second component 4 has a central reinforced area 22 on its underside. The weld seam 23 should be placed close to this area 22 in the target state of the joint 1. When viewing the welded assembly from above, i.e., from the side of the joint 1 provided with the joint 1 or weld seam 23, the progression of the reinforced area 23 is not visible. By means of a piece of target joint information 14 displayed accordingly in the display device 8 in the form of the desired target progression of the joint 1 or weld seam 23, it can be rendered possible to perform an inspection in which the fulfilment of the target criterion with respect to the progression of the weld seam 23 relative to the reinforced area 22 is considered. The target progression or the target joint information 14 comprises a graphic display of a minimum and maximum distance 24, 25 to the reinforced area 22, for example starting from a reference edge 26. In the present example, the weld seam 23 with its actual position 28 lies within the target specifications of the minimum and maximum distance 24, 25.

Figure 4:
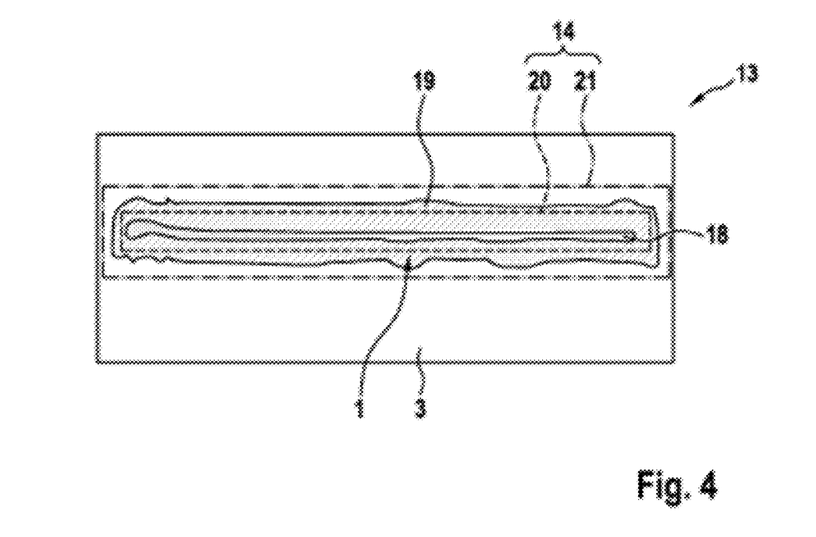
FIG. 4 is a schematic representation of a weld connection to be inspected according to an exemplary embodiment.

FIG. 4 also shows the display of the real image of the joint 1, with a weld seam 18 and the joint information 13 on the display device 8. During the welding process, a so-called cleaning area 19 (light gray) forms around the weld seam 18 (dark gray). In addition to the analysis of the observance of a tolerance range 20 for the weld seam 18 itself, additionally or alternatively, a tolerance range 21 for the cleaning area 19 can also be considered. These tolerance ranges 20, 21 are shown as a surface area enclosed by a dashed line for the tolerance range 20 of the weld seam 19 and as a surface area enclosed by a dashed-dotted line for the tolerance range 21 of the cleaning area 19. In the present example, the weld seam 18 and the cleaning area 19 are to be assessed as OK, as they are respectively to be evaluated within the tolerance ranges 20, 21.

An inspector can perform an input via the input device 10 arranged on the inspection device 5. In this way, the inspector can enter a piece of assessment information relating to at least areas of the joint 1 into the input device 10. These can be stored in a data storage device (not shown) that communicates with the inspection device 5.

LIST OF REFERENCES

1 Joint
2 Assembly
3 First component
4 Second component
5 Inspection device
6 Area
7 Inspector
8 Display device
9 Capturing unit
10 Input device
11 First window area of 8
12 Second window area of 8
13 Joint information
14 Target joint information
15 Upper tolerance limit
16 Lower tolerance limit
17 Measurement process information
18 Weld seam
19 Cleaning area
20 Tolerance range of 18
21 Tolerance range of 19
22 Reinforced area
23 Weld seam
24 Minimum distance
25 Maximum distance
26 Reference edge
27 Deviation information
28 Actual position of 23
29 Reference element
30 Reference marking
31 Square

What is claimed is:

1. A method for inspecting a joint of an assembly of a motor vehicle, the assembly including at least two components that have been joined together in a joining method, comprising:
   orienting an inspection device toward at least one area of the joint to be inspected;
   reproducing an image of the joint to be inspected on a display device;
   displaying a piece of joint information relating to the joint to be inspected of the assembly via the display device;
   displaying at least one reference marking on the display device; and
   orienting the inspection device relative to the joint and/or adjusting the at least one reference marking such that the at least one reference marking is brought into a predetermined relative position, with at least one real reference element.

2. The method according to claim 1, further comprising:
   inspecting at least one area of the joint to be inspected while considering the image of the joint to be inspected reproduced on the display device and the joint information displayed on the display device, wherein the inspection comprises a comparison.

3. The method according to claim 2, wherein
   the joint information is at least partially displayed as at least a piece of target joint information, comprising a spot, line and/or surface-area range, of a predefined target state of the joint to be inspected, and
   the inspecting of the at least one area of the joint comprises a determination that the reproduced image is in contact with, and/or a defined area thereof lies within, a point, line and/or surface-area range,
   the target joint information at least partially comprises a piece of information relating to a geometry, a temperature, a position, an orientation and/or a tolerance of a defined target state of the joint to be inspected, and
   the inspection of the target joint information with the reproduced image comprises a measuring of the joint to be inspected.

4. The method according to claim 3, wherein
the target joint information at least partially comprises a piece of information relating to a geometry, a temperature, a position, an orientation and/or a tolerance of a defined target state of the joint to be inspected, and
an inspecting of the target joint information with the reproduced image comprises a measuring of the joint to be inspected.

5. The method according to claim 1, further comprising:
capturing the image of the joint to be inspected by a capturing unit arranged on the inspection device; and
reproducing the image captured by the capturing unit on the display device.

6. The method according to claim 1, further comprising:
reproducing the image of the joint to be inspected on at least one transparent area of the display device.

7. The method according to claim 1, further comprising:
including, in the displayed joint information, at least one piece of joining process information used in a joining process that forms the joint to be inspected and/or derived from a joining process that forms the joint to be inspected.

8. The method according to claim 7, wherein
the joining process information is geometry data, welding current, welding voltage and/or tong pressure of a welding process used for carrying out the joining process.

9. A method for inspecting a joint of an assembly of a motor vehicle, the assembly including at least two components that have been joined together in a joining method, comprising:
orienting an inspection device toward at least one area of the joint to be inspected;
reproducing an image of the joint to be inspected on a display device;
displaying a piece of joint information relating to the joint to be inspected of the assembly via the display device;
carrying out a computer-based measurement process on the joint to be inspected, before or during the inspection of the joint, in order to generate a piece of measurement process information comprising a measurement result; and
including the measurement process information in the displayed joint information, wherein at least one measurement result is displayed as a component of the joint information.

10. The method according to claim 9, further comprising:
comparing the measurement result with a predefined target measurement result in order to determine a piece of deviation information; and
including the deviation information in the displayed joint information, wherein the deviation information is output as a deviation marking superimposed at least in areas on the image reproduced on the display device.

11. The method according to claim 10, further comprising:
inputting, into an input device, a piece of assessment information relating to at least areas of the joint;
storing the assessment information in a data storage device; and
correlating the assessment information to: (i) a piece of assembly area information and/or assembly identification information, (ii) the joining process information, (iii) the deviation information, (iv) the joining process information, and/or (v) the measurement process information.

12. The method according to claim 9, further comprising:
issuing a request, via the display device, for input of a piece of assessment information via an input device for a piece of deviation information indicating a deviation, at least in areas, of a measurement result from a predetermined target measurement result.

13. A method for inspecting a joint of an assembly of a motor vehicle, the assembly including at least two components that have been joined together in a joining method, comprising:
orienting an inspection device toward at least one area of the joint to be inspected;
reproducing an image of the joint to be inspected on a display device;
displaying a piece of joint information relating to the joint to be inspected of the assembly via the display device;
displaying a piece of geometry information derived from CAD data of the joint to be inspected, in a first window area of the display device; and
displaying a piece of assembly area information and/or assembly identification information, a piece of joining process information, a piece of deviation information, a piece of assessment information and/or a piece of measurement process information in a second window area of the display device, wherein
at least the geometric joining process information displayed in the first window area is superimposed on the image reproduced on the display device.

14. A device for inspecting a joint of an assembly, made of at least two components that have been joined together in a joining method, comprising an inspection device configured to carry out a method according to claim 1.

* * * * *